United States Patent
Hale et al.

[15] 3,649,770

[45] Mar. 14, 1972

[54] TONE SIGNALING SYSTEM

[72] Inventors: Otis L. Hale; Charles D. Rakes, both of Little Rock, Ark.

[73] Assignee: Fan Tron Corporation, Little Rock, Ark.

[22] Filed: Dec. 24, 1960

[21] Appl. No.: 887,971

[52] U.S. Cl. ........................................ 179/84 VF, 179/90 K

[51] Int. Cl. ........................................ H04m 1/50, H04q 9/12

[58] Field of Search ........................ 179/84 VF, 90 B, 90, 90 K

[56] References Cited

UNITED STATES PATENTS

| | | | |
|---|---|---|---|
| 3,488,451 | 1/1970 | Nenninger | 179/90 K |
| 3,161,728 | 12/1964 | Rose | 179/84 VF |
| 3,301,967 | 1/1967 | Alyer | 179/90 BD |
| 3,515,806 | 6/1970 | Spraker | 179/84 VF |

*Primary Examiner*—Kathleen H. Claffy
*Assistant Examiner*—William A. Helvestine
*Attorney*—Hill, Sherman, Meroni, Gross & Simpson

[57] ABSTRACT

A tone signaling system comprises a tone transmitter and a tone receiver in the form of an encoder and a decoder, respectively, for generating, transmitting and translating information in the form of a serial train of tone signals. The encoder utilizes a plurality of oscillators in the form of a bridged-T configuration for generating a plurality of selected frequencies under the control of a keyer and a plurality of timers which initiate tone generation and the spacing of the tones. The decoder employs a plurality of active tuned filter circuits, also in the same basic bridged-T configuration, which circuits and their following detectors are sequentially operated by the sequence of tones to effect energization of indicating apparatus.

29 Claims, 10 Drawing Figures

INVENTORS
OTIS L. HALE
CHARLES D. RAKES
BY Hill, Sherman, Meroni, Gross & Simpson ATTORNEYS INVENTORS
OTIS L. HALE
CHARLES D. RAKES
BY Hill, Sherman, Meroni, Gross & Simpson ATTORNEYS

INVENTORS

OTIS L. HALE
CHARLES D. RAKES

BY Hill, Sherman, Meroni, Gross & Simpson
ATTORNEYS

INVENTORS
OTIS L. HALE
CHARLES D. RAKES

BY Hill, Sherman, Meroni, Gross & Simpson ATTORNEYS

INVENTORS
OTIS L. HALE
CHARLES D. RAKES

BY Hill, Sherman, Meroni, Gross & Simpson ATTORNEYS

INVENTORS
OTIS L. HALE
CHARLES D. RAKES

BY Hill, Sherman, Meroni, Gross & Simpson ATTORNEYS

INVENTORS

Otis L. Hale

Charles D. Rakes

BY Hill, Sherman, Meroni, Gross & Simpson

ATTORNEYS

TONE SIGNALING SYSTEM

BACKGROUND OF THE INVENTION

1. Field of the Invention

This invention relates to tone signaling apparatus, and in particular to apparatus for selectively encoding and transmitting information as a serial train of tone signals, and apparatus for receiving and decoding such tone signals.

2. Description of the Prior Art

The transmission of information from one station to another distant station as a plurality of tones, or combinations of tones, is well known in the art and used quite extensively in telephone, telegraph and telemetry applications to great advantage. For example, a telephone subscriber or a telephone operator generates a series of tone combinations by selective operation of oscillators in a key set, which tone combinations are decoded by central office equipment to determine the intended destination, or other information, concerning a telephone call. If the desired tone transmission is again to take place, it is necessary for the directory number to again be keyed into the system. Similar types of apparatus are also found in telegraph and telemetry systems, wherein there is some means for producing a serial train of pulses to be decoded and a receiver includes apparatus for decoding the tones received. Generally speaking, such systems are relatively complex and require a large amount of switching techniques in order to change frequency in accordance with desired code changes. Further, such apparatus is generally inflexible from a design standpoint in that the same basic design may not be used for both low and high capacity systems.

SUMMARY OF THE INVENTION

According to the invention, a transmitting station includes an encoder and a receiving station a decoder, both of which have unique features and lend themselves to unique design capabilities for complete system of either high or low capacity without departing from a basic system configuration.

The encoder employs a plurality of bridged-T oscillators, the outputs of which are fed to a common amplifier for transmission. A series of code selection switches are manually operable to determine the operating frequencies, and thus the tones generated, by the oscillators. Sequential generation and transmission of the tones is governed by a control circuit which includes a keyer for initiating, and repeating, the transmission and a plurality of timers which are effective to effect operation of the oscillators for predetermined intervals and with predetermined spacing between the generated tones.

The decoder comprises means for detecting each of the tones, means for determining the detection of a complete sequence of tones, and means for providing an indication of sequence detection.

BRIEF DESCRIPTION OF THE DRAWINGS

The foregoing and other objects, features and advantages of the present invention, its organization, construction and operation will be best understood by reference to the following description taken in conjunction with the accompanying drawings in which.

BRIEF DESCRIPTION OF THE PREFERRED EMBODIMENT

Figure 1A:
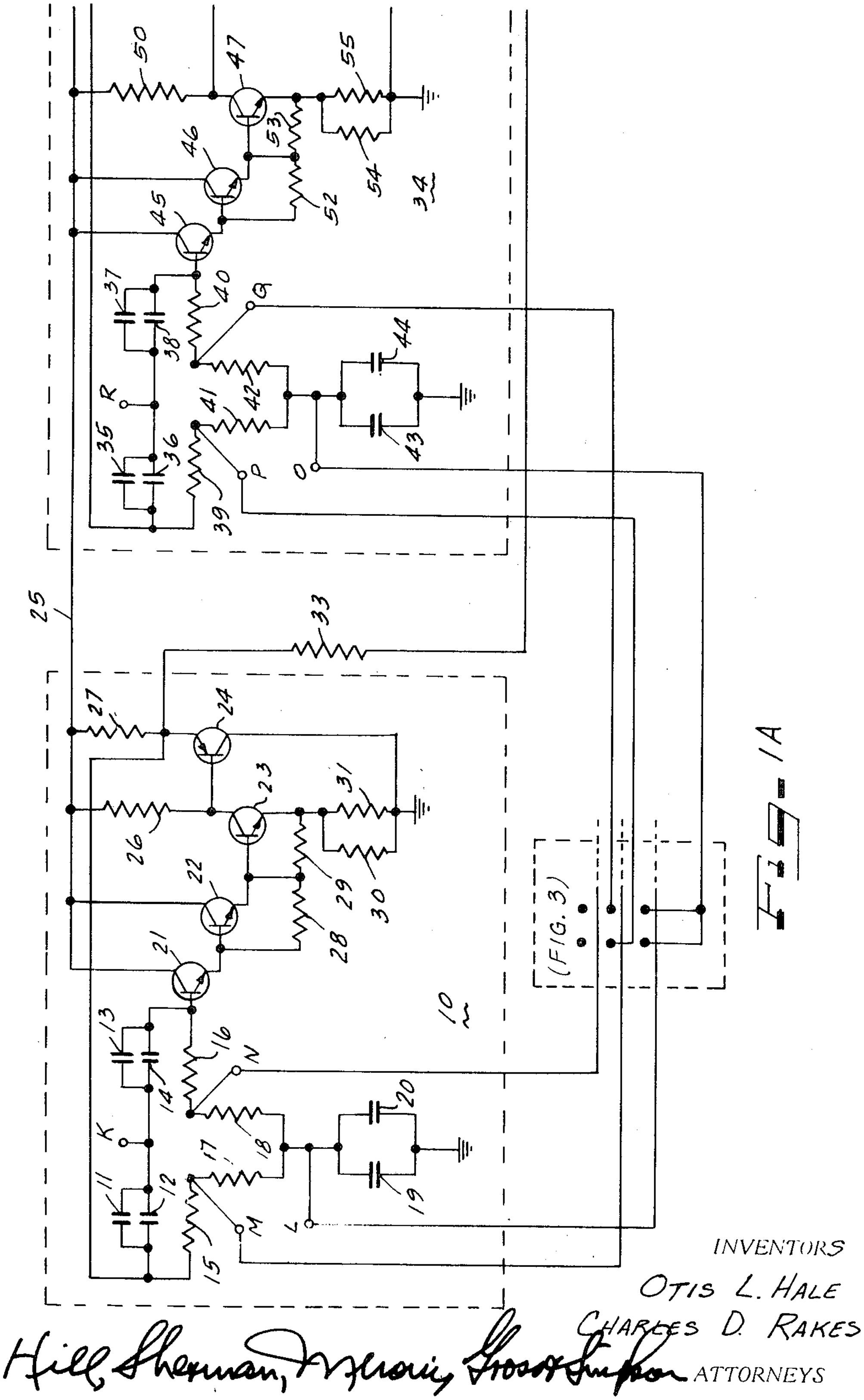
FIGS. 1A, 1B, 2A, 2B and 3 are arranged in accordance with FIG. 4, together form a schematic circuit representation of an embodiment of an encoder constructed in accordance with the principles of the present invention wherein FIGS. 1A and 1B generally illustrate a plurality of tone generators and a common amplifier, FIGS. 2A and 2B generally illustrate a control circuit for controlling the operation of the apparatus in FIGS. 1A and 1B, and FIG. 3 schematically illustrates a plurality of selector switches for determining the frequency of operation of the above-mentioned oscillators.

Encoder (FIGS. 1A–4) in the particular embodiment illustrated in the drawings, the encoder generally comprises a pair of bridged-T oscillator circuits 10 and 34, connected to a common output amplifier 57–63 for connection to a transmission medium at output terminals 72 and 73.

The encoder further comprises a timed keyer and reset circuit 77 for initiating controlled operation of the oscillators 10 and 34, a pair of tone timers 103 and 126 respectively controlling the duration of operation of the oscillators 10 and 34, and a gap timer 116–124 for controlling the interval between operation of the oscillators 10 and 34.

Figure 3:
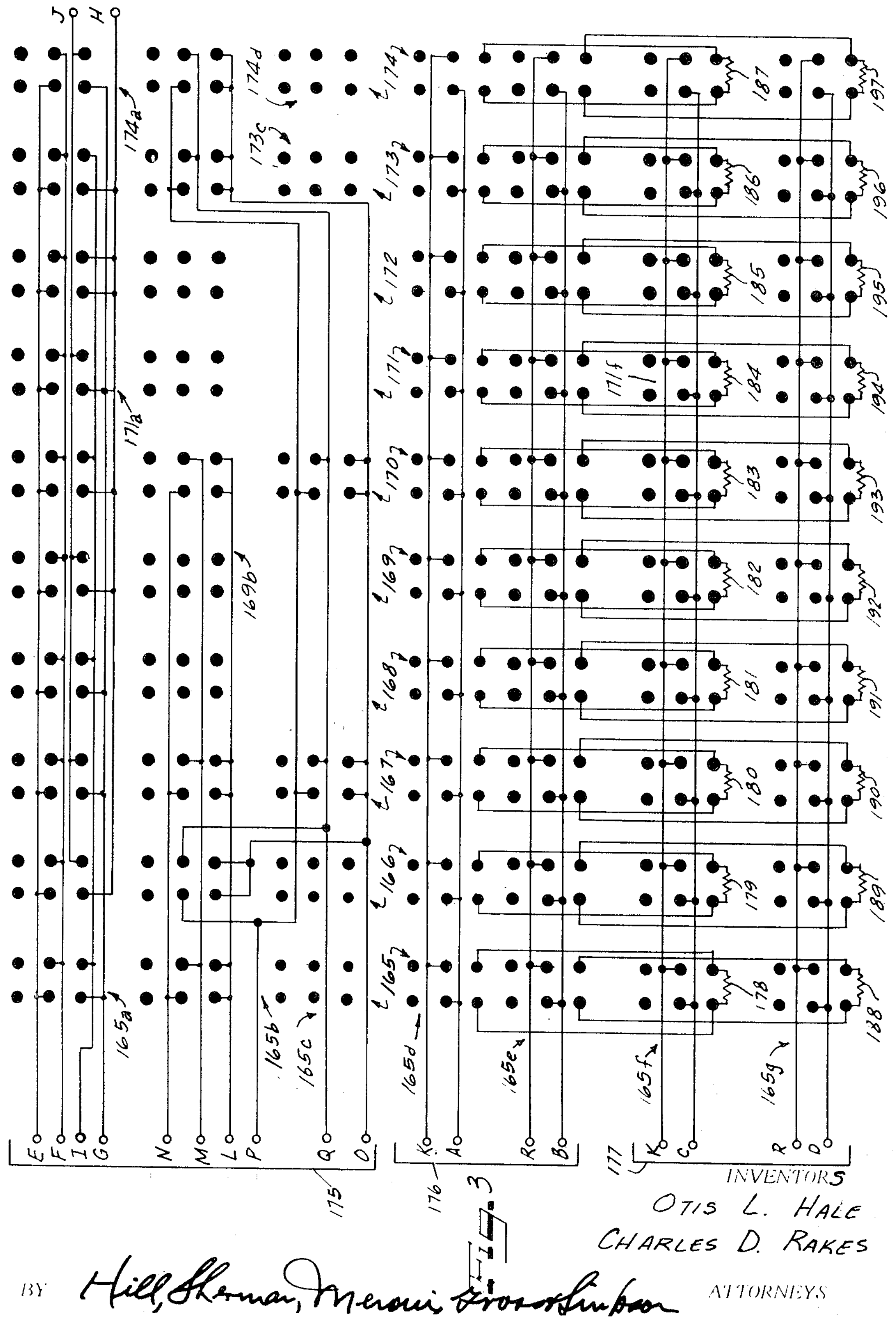
Figures 1B, 4, 6:
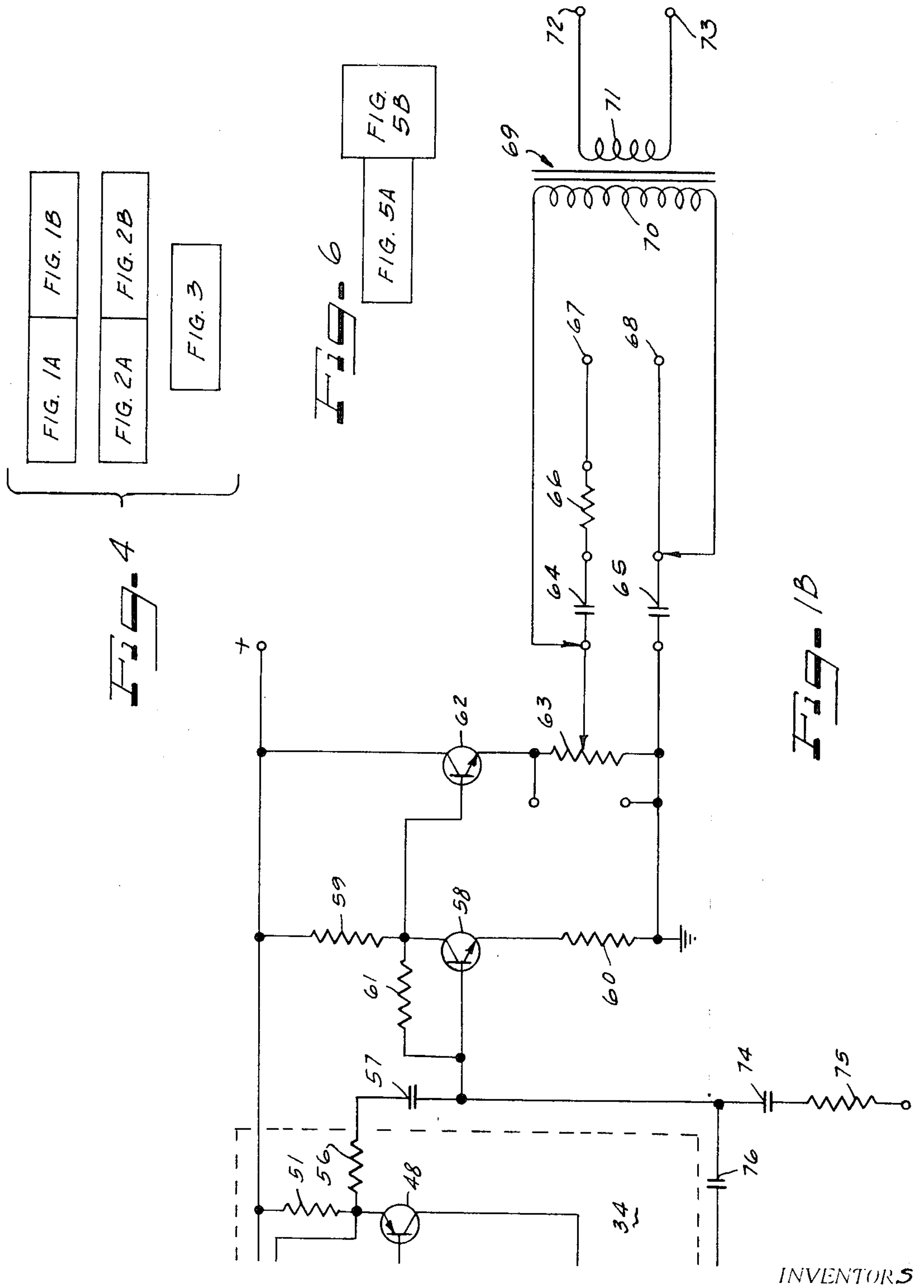

The encoder also includes a plurality of frequency selectors 149–152 which are operated in response to the operation of the tone timers 103 and 126 to control frequency selection by way of the frequency selecting switch groups 175–177 of FIG. 3. Each of the switch grooves 175–177 comprises a plurality, here ten, double-pole, double-throw switches for selectively connecting a plurality of elements 178–197 to the oscillators 10 and 34 by way of the frequency selectors 149–152.

In operation, a send switch 78 including a movable contact 79 and a pair of stationary contacts 80 and 81 is closed to extend the postic potential on conductor 99 to the base of a transistor 82 by way of relay contacts 84 and 85, resistor 89 and resistor 91 to enable the transistor 82 which acts as a relay driver to connect a relay winding 83 in an operational circuit between ground and a supply potential. An indicating lamp 88 is connected across the winding 83 and provides an indication that winding 83 has been connected in an operating circuit and that transmission will ensue. A diode 87 is connected across the winding 83 for transient suppression as is well-known in the art.

The relay winding 83 is energized to pull its contact 84 from engagement with its contact 85 and into engagement with its other stationary contact 86 to provide the positive potential on conductor 99 by way of a resistor 92 to maintain transistor 82 operated and winding 83 energized.

The closure of the contract 84 to the contact 86 also provides the positive potential on conductor 99 to a charging circuit comprising a resistor 93 and a capacitor 94, which has test points TP thereacross. The charging of the capacitor 94 is utilized as a timing function for initiating the operation of the first tone timer 103 by way of a pair of transistors 97 and 101.

The transistor 97 has its base connected to the capacitor 34 through a zener diode 95 and to the emitter and ground by way of a resistor 96. The transistor 97 also has its collector connected to positive potential at conductor 99 by way of a resistor 98 and to the base of transistor 101 by way of a resistor 100. The transistor 101 has its emitter connected directly to the positive potential at conductor 99 and its collector connected to the emitter of transistor 97 and ground by way of a resistor 102.

With the application of a positive potential to the capacitor 94 it begins to charge toward the potential applied thereto. As the charge reaches the zener breakdown voltage of the zener diode 95, which is timed dependent upon the values of resistor 93, capacitor 94 and zener diode 95, the zener diode conducts to provide in enabling potential across the resistor 96 to turn on the transistor 97. The conduction of the transistor 97 in turn provides essentially ground potential at the junction between the resistors 98 and 100 which is sufficient to render the transistor 101 conductive, to produce a positive pulse at its collector.

The positive pulse at the collector of the transistor 101 is coupled to the first tone timer 103, particularly to the to the base of a transistor 106 by way of a capacitor 104 and a resistor 105. The transistor 106 and a companion transistor 110 are connected in a monostable configuration with their emitters connected to ground and their collectors respectively connected to the positive potential at conductor 99 by way of resistors 107 and 112. Further, the collector of transistor 106 is connected to the base of the transistor 110 by way of a capacitor 108 and a resistor 109. The base of transistor 110 is further connected to positive potential through a resistor 111. Also, as is common practice, a resistor 113 connects the collector of the transistor 110 to the base of the transistor 106 and a capacitor 114 is connected between the base and emitter electrodes of the transistor 106.

The positive pulse supplied to the base of the transistor 106 causes it to saturate and place the positively charged end of capacitor 108 at essentially ground potential. The capacitor 108 is discharged into the base of the transistor 110 offsetting the normal forward bias applied thereto by the resistor 111. The transistor 110 is enabled and a positive potential appears at its collector and is applied by way of the resistor 113 to the base of the transistor 106. The transistor 110 is rendered nonconductive for a period of time dependent upon the values of the capacitor 108, the resistor 109 and the resistor 111. During the off time of the transistor 110 a positive voltage is applied by way of a resistor 115 and terminal E to one of the inputs G, H, I, or J of the frequency selectors 149–152. Which of these inputs is selected is determined by the code selector switches of the code selection switch groups 175–177.

The outputs of the frequency selectors 149–152 connect a frequency determining resistor to either the oscillator 10 or the oscillator 34, in this case the oscillator 10, and to ground. For example, closure of switch 171*a* to its lower position as viewed in the drawing will extend the positive potential at terminal E through the switch to terminal I of frequency selector 151. This positive potential renders the transistor 160 conductive to extend ground therethrough to terminal C thereof, which terminal C is extended to the switch group 177. Further, assuming that the switch 171*f* is closed to its lower switch position, the ground at terminal C is placed on the left hand terminal of a frequency determining resistor 184, the other terminal of which is extended by way of terminal K to the oscillator 10.

The grounding of terminal K through the resistor 184 initiates operation of the oscillator 10.

The oscillator 10 comprises a bridged-T circuit configuration including a frequency selecting element, such as resistor 184, a plurality of capacitors 11–14, a series of resistors 15-18 connected in parallel across the capacitors 11–14 and a pair of capacitors 19 and 20 connected in parallel with each other and in series between ground and the junction between the resistors 17 and 18. In addition to the input terminal K, the circuit includes a plurality of other input terminals L, M and N which are selectively associated with each other by way of the switch group 175. Therefore, switches 165–170 in switch group 175 are effective to alter the configuration of the bridged-T circuit, and accordingly its frequency of operation.

Also included in the oscillator 10 are a plurality of transistors 21–24 connected generally in a cascade arrangement and biased by resistors 26–31 in a circuit configuration between ground and conductor 25 which carries a regulated direct current voltage. The emitter of the output transistor 24 has a feedback connection extending to the bridged-T network at the junction between capacitors 11 and 12 and the resistor 15.

The first tone frequency and its duration are determined by the time that terminal E remains positive, which as mentioned above, is dependent upon the time constant involving the value of the capacitor 108. Neither the oscillator 10 nor the oscillator 34 is operative except during the time that a frequency determining resistor is connected to the respective terminals A and R of the oscillators and such resistor is switched to ground. At the end of the switching time of transistor 106 and transistor 110, the transistor 106 turns off allowing its collector to rise to a positive potential thereby applying a positive pulse to the base of a transistor 118 of a gap or interval timer by way of the conductor having the terminals referenced X, Z and a capacitor 116 and a resistor 117. The gap timer includes a pair of transistors 118 and 122 which are connected to positive potential at conductor 99 by way of resistors 120, 123 and 124, and which are interconnected in a monostable multivibrator configuration similar to that of the timer 103 by way of a capacitor 119, a resistor 121 and a resistor 125. The operation of the gap timer in response to the positive potential applied thereto from the collector of the transistor 106 is similar to the operation of the monostable multivibrator previously discussed and the point will not be dwelt upon here. However, it should be pointed out that the gap timer serves to control the spacing between pulses, that is the time interval between the termination of one pulse and the initiation of the succeeding pulse. This is effected by interposing the gap timer between the first tone timer 103 and the second tone timer 126 as a means for delaying the triggering of the second tone timer 126.

At the end of the delay time, the collector of the transistor 118 rises to a positive potential, which potential is extended over the conductor including the terimals referenced V and Y, and by way of a capacitor 127 and a resistor 128 to the base of a transistor 129 of the second tone timer 126. The second tone timer 126 includes a pair of transistors 129 and 133 which are interconnected in the same configuration as the first tone timer 103 by way of a capacitor 131, a resistor 132 and a resistor 136. The transistors 129 and 133 are similarly connected to positive potential at conductor 99 by way of the resistors 130, 134 and 135. The timer 126 operates in exactly the same manner as the previously discussed timers to provide a positive output potential of predetermined duration at terminal F. The positive output output at terminal F is similarly effective as the positive output at terminal E; the timer 126 being effective to initiate operation of the oscillator 34 in accordance with the settings of the switches of FIG. 3 for such a predetermined duration.

The oscillator 34 has the same configuration as the oscillator 10 and operates in the same manner. The oscillator 34 comprises a bridged-T network including a plurality of capacitors 35–38, a plurality of resistors 39–42 and a second plurality of capacitors 43 and 44, the network being connected between the ground reference and the input and output of the oscillator 34. The oscillator further comprises a plurality of transistors 45–48 interconnected and biased by a plurality of resistors 50–55, as was the case with the oscillator 10. The oscillator 34 includes a terminal R for having a selective one of the resistors 178–179 connected between that terminal and ground by way of the frequency selectors 149–152. The circuit further includes a plurality of terminals O, P and Q which are selectively interconnected by switches in switch group 175 to modify the configuration thereof.

The oscillator 10 and the oscillator 34 are commonly connected to an output amplifier by way of a resistor 33 and a capacitor 76, and by way of a resistor 56 and a capacitor 57, respectively. The output signals of the oscillators are impressed at the base of a transistor 58 which has its collector connected to positive potential by way of a resistor 59 and its emitter connected to ground by way of a resistor 60. The base and collector of the transistor 58 are further connected together by way of a resistor 61 for stable operation. The amplifier further includes an emitter follower circuit including a transistor 62 and a emitter resistor 63 which are connected between positive potential and ground. The resistor 63 is variable to vary the output taken thereacross by way of a pair of capacitors 64 and 65 and a resistor 66 to a pair of output terminals 67 and 68. A further output may be taken for connection to a transmission medium by way of a transformer 69 including a primary winding 70 and a secondary winding 71.

The output at terminals 67 and 68 is a code output which may be utilized for any desired purpose, such as monitoring; whereas, the output at terminals 72 and 73 is preferred for connection to a transmission facility, for example to a balanced 600 ohm line.

GAP INSERTION (FIGS. 2A-2C)

Figures 2A, 2C:
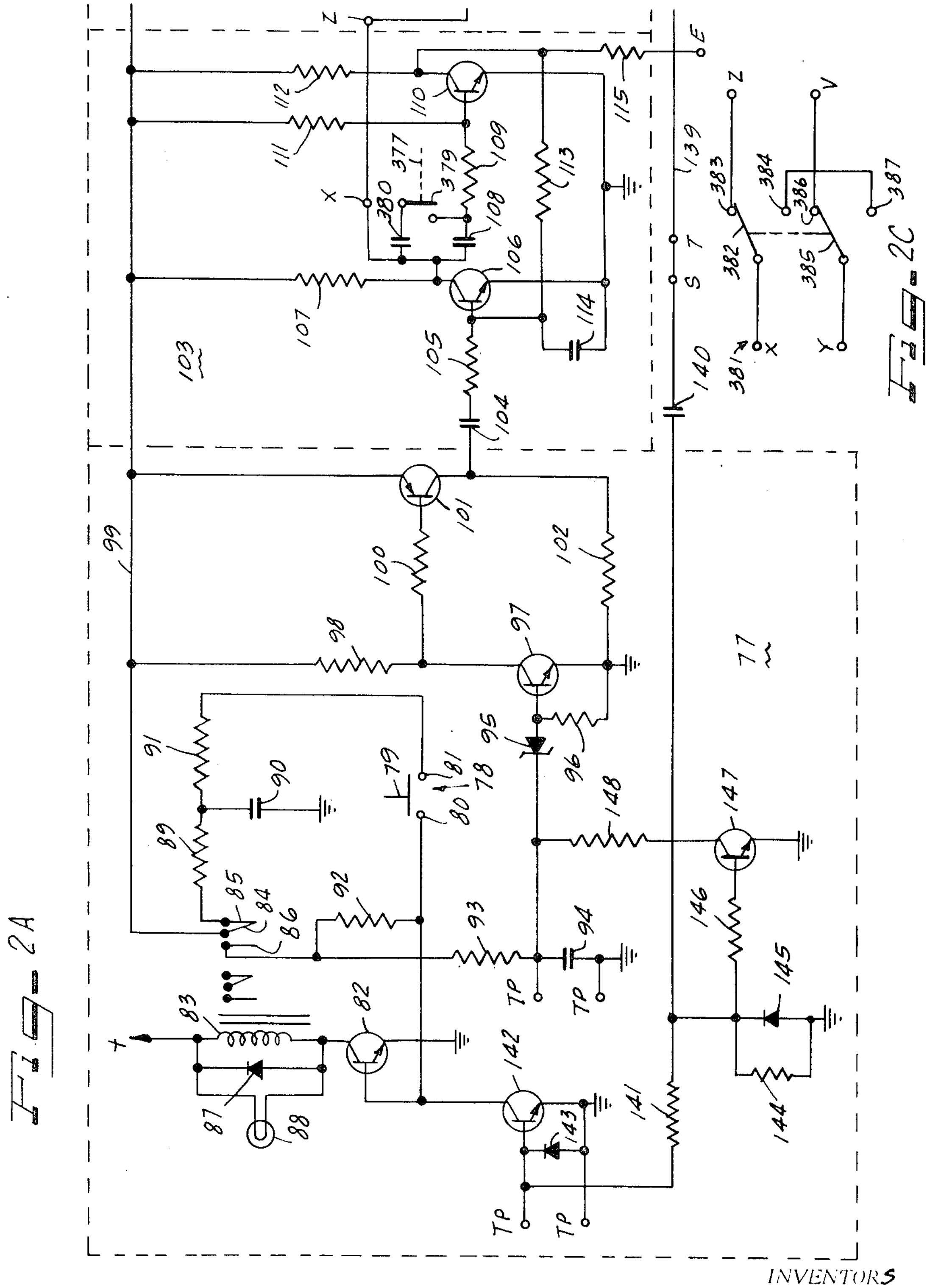
FIG. 2C illustrates an optional mode of operation wherein an interval timer may be switched into and out of the control circuit of FIGS. 2A and 2B.
Figure 2B:
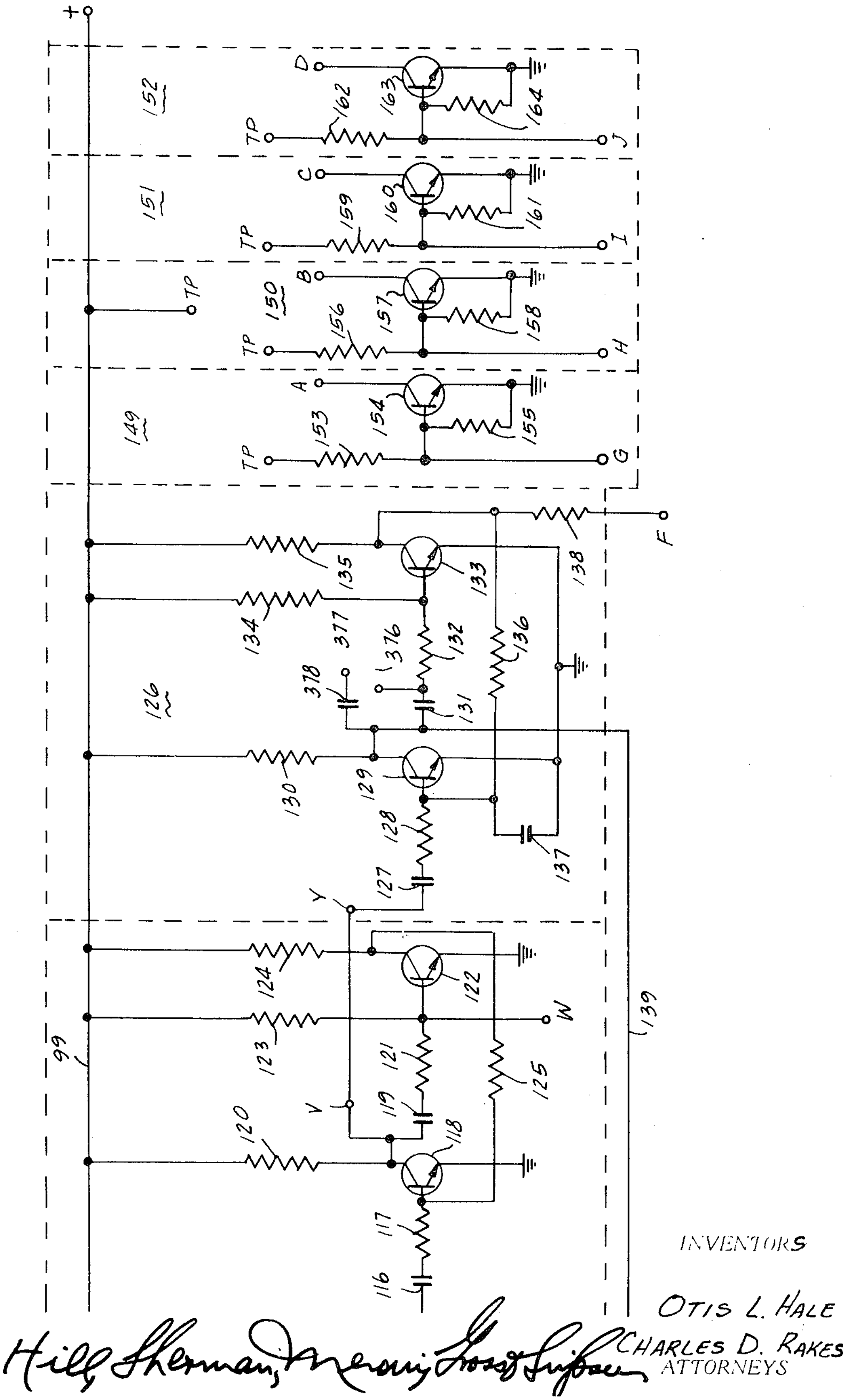

Attention is invited to the gap insertion switch 381 of FIG. 2C which may be connected in the circuit 2A and 2B in place of the conductors which extend between point X and point Z and between point V and point Y. In the position shown the gap insertion switch includes a movable contact 382 which is connected to a contact 383 and a movable contact 385 which is connected to a contact 386. In the position shown, the switch 381 renders the circuit electrically as illustrated in FIGS. 2A and 2B. Operation of this switch moves the contact 382 into engagement with contact 384 and the contact 385 into engagement with the contact 387 to effectively shunt the gap timer by connecting point X of the timer 103 to point Y of the timer 126 which would virtually eliminate any interval between successive tone signals.

SPEED SELECTION (FIGS. 2A AND 2B)

An added feature of versatility is provided for the encoder hereinbefore discussed by the provision of a plurality of timing elements, capacitors being specifically illustrated, to vary the time constance of the timers 103 and 126. Specifically, timer 103 is illustrated as including a pair of capacitors 108 and 380 which may be connected in parallel by the closure of a switch contact 379. Similarly, the timer 126 includes a switch contact 376 which is ganged as indicated at 377 to the switch contact 379, and which upon closure connects a capacitor 378 in parallel with the timing capacitor 131.

The parallel connection of capacitors increases the equivalent capacitance and hence the time constants of the individual circuits to speed up operation thereof. The same effect could be realized by utilizing a plurality of capacitors, or for that matter resistors, and selectively connecting such elements in circuit by means of a rotary switch or the like.

RESET (FIGS. 2A AND 2B)

As stated above, the second tone frequency is generated for a duration determined by the time constant associated with the timing capacitor 131 in the second timer 126. At the end of the time output of the tone timer 126, or of the last tone timer in an expanded sequence system, the collector of the transistor 129 rises toward the potential on conductor 99, which potential is extended by way of conductor 139 across capacitor 140 and a resistance 141 in series therewith to the base of a transistor 142 in the timed keyer and reset circuit 77. This positive pulse is effective to render the transistor 142 conductive to remove the forward bias of the latch provided to the transistor 82 and causes the transistor 82 to become nonconductive. This, in turn, removes the operating power from the winding 83 and the relay restores to its initial condition. Restoration of the relay effects a transfer of the movable contact 84 from engagement with the contact 86 and into engagement with the contact 85 to prepare the system for reactivation by way of the send switch 78.

If switch 78 is maintained operated, a complete sequence is repeated as long as the switch is held operated causing retransmissions of the encoded information.

Attention is invited that the transistor 142 is provided with a diode 143 connected between its base and emitter and poled in a direction so as to prevent any disturbance in the operation of the transistor 142 when negative impulses may be impressed at the base thereof.

At the same time the positive pulse is supplied to the base of the transistor 142, such pulse is also applied to the base of a transistor 147 by way of a resistor 146. The transistor 147 is also protected by a diode 145 and a resistor 144 connected in parallel across its base emitter circuit. The positive potential afored to the base of the transistor 147 is effective to render that transistor conductive to remove any residual charge from the capacitor 94 by way of a resistor 148 and the transistor 147 to insure the same keying time prior to each initiation of the first tone of the sequence after the first closure of switch 78 or in a repeated mode of operation with switch 78 held closed.

CODE SELECTION AND SYSTEM EXPANSION

Although an example has been given for code selection in the foregoing description, further discussion on this point is considered necessary to render a thorough description of this invention.

The oscillators 10 and 34 have frequency determining resistors connected thereto by way of the code selection switches at the respective points K and R to effect oscillation. Several frequency determining resistors are employed for a set of frequencies for each oscillator. One set of frequency determining resistors is utilized with oscillator 10, with points L, M and N, as illustrated in the drawings, to produce a first group of tones. The same set of frequency determining resistors are employed with oscillator 10 but with points L, M and N are connected together to produce a second different group of tones.

Oscillator 34 functions the same as oscillator 10, but operates at groups of frequencies different from that of the oscillator 10. Connection of points O, P and Q of oscillator 34 causes its set of frequency determining resistors to produce a third group of tones, and operation of the oscillator with these points disconnected produces a fourth group of tones, the third and fourth groups of tones being different from each other and different from the two groups of tones generated by oscillator 10.

As previously stated, both oscillators 10 and 34 are fed to a common amplifier to feed the desired sequentially timed spaced tones to the desired transmission media.

The particular tones generated are determined by the apparatus illustrated in FIG. 3. More than three digits may be encoded and transmitted by adding additional tone timers between points S and T (FIG. 2A) and additional frequency selectors, such as selectors 149-152 (FIG. 2B). Additional oscillators similar to oscillators 10 and 34 may be employed to produce additional code groups in conjunction with the additional frequency selection components. Of course, additional gap timers and tone timers may be employed to produce additional codes by variation of the tone frequency, tone time lengths, and space in-between the tones.

Inasmuch as the code to be transmitted is set in a mechanically switched encoder and registered by the switches prior to sending, the same code is maintained registered after sending for varification that the proper code was transmitted. The same code may be repeated as many times as desired without inserting the desired code each time transmission is necessary.

DECODER (FIGS. 5A, 5B AND 6)

Figure 5A:
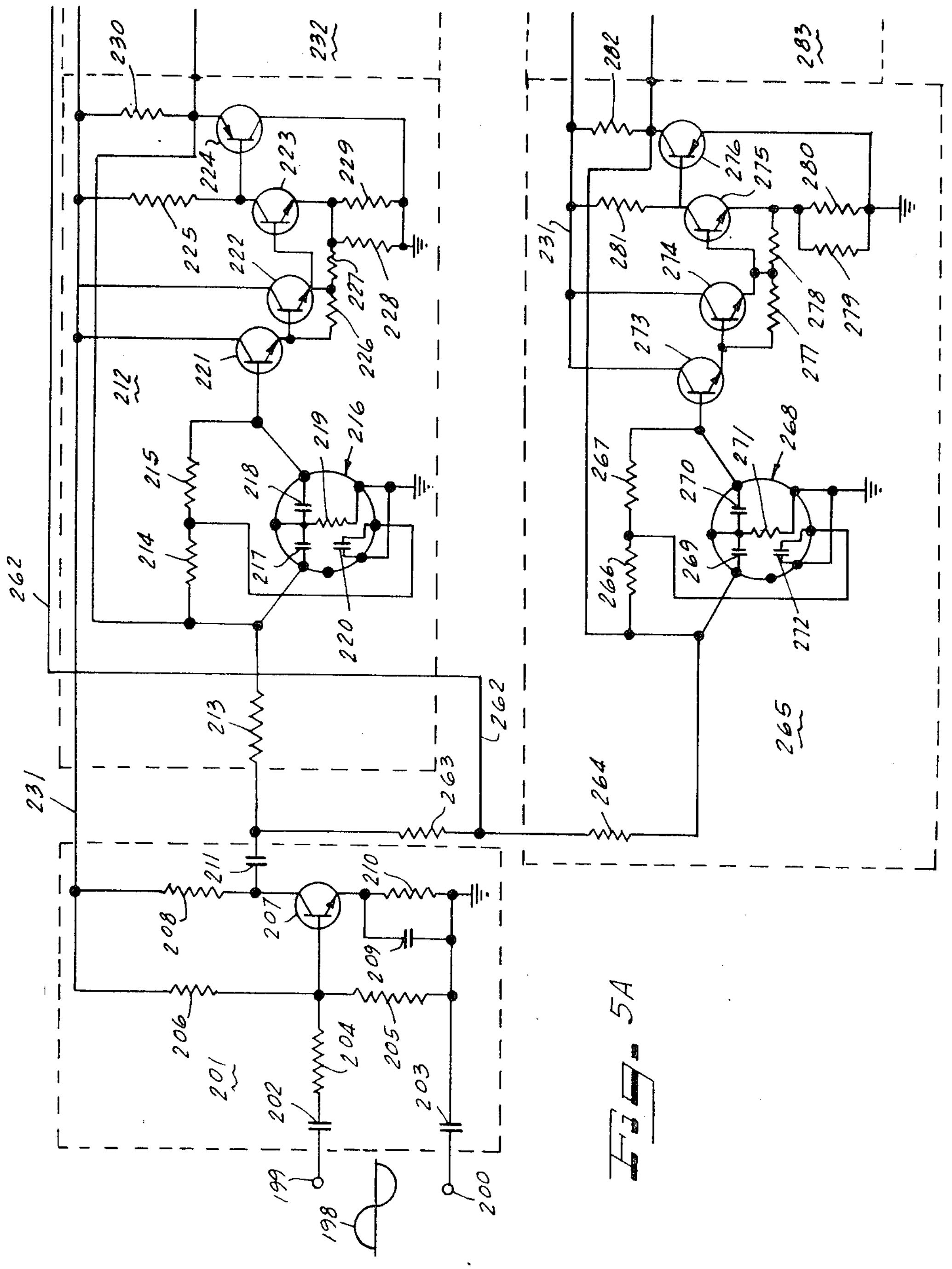
FIGS. 5A and 5B, arranged according to FIG. 6, together form a schematic representation of an embodiment of a decoder constructed in accordance with the principles of the present invention, FIG. 5A illustrating a common limiter circuit which feeds a plurality of filter circuits and FIG. 5B illustrating the corresponding detector circuits and sequence indicating apparatus.
Figure 5B:
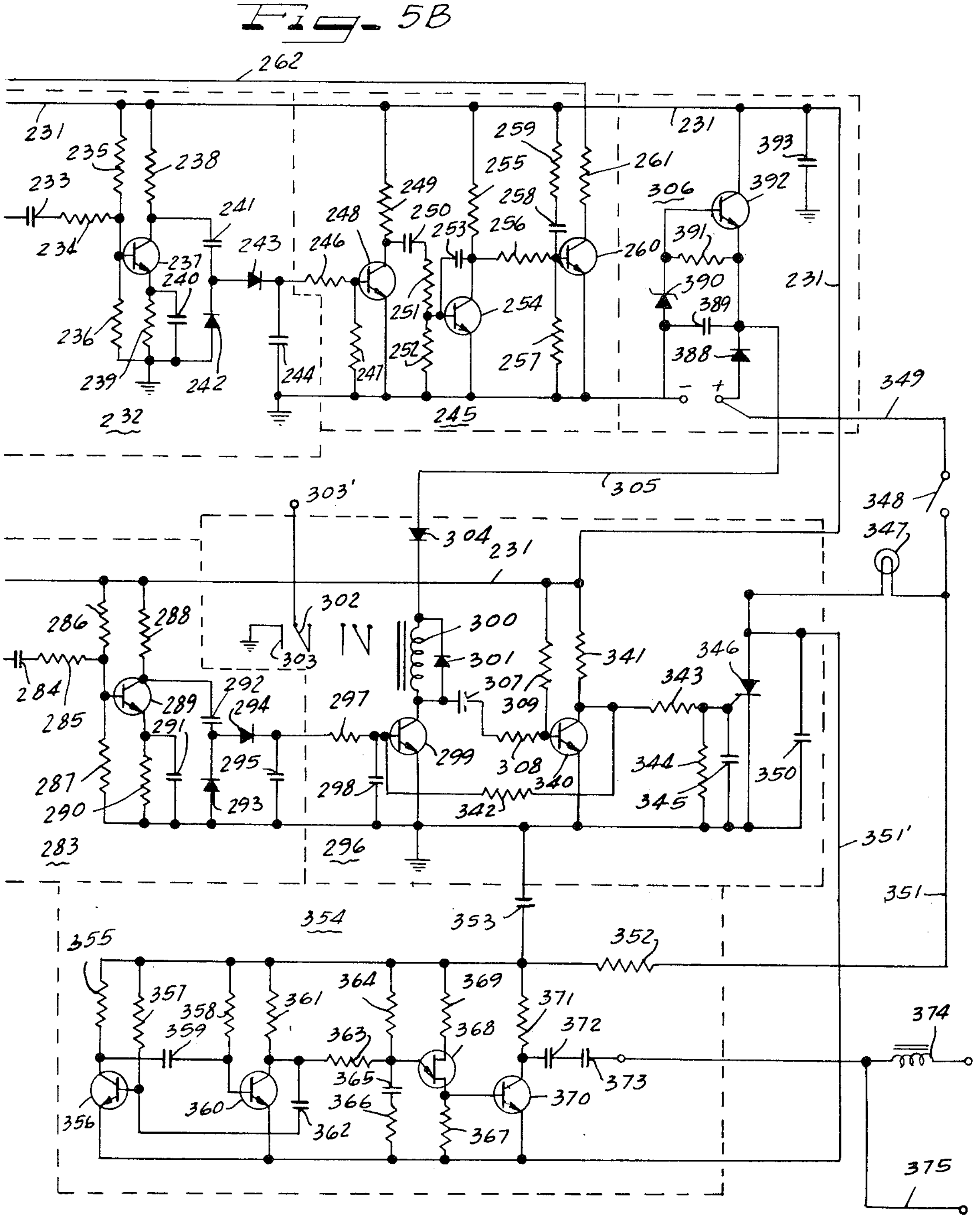

The tones transmitted at a station including the previously discussed encoder are received at a receiving station by apparatus including a decoder, such as illustrated in FIGS. 5A and 5B.

The decoder generally comprises a limiter amplifier 201 which feeds a pair of tone filters 212 and 265. Each of the tone filters has associated therewith a corresponding detector circuit 232 and 283 which is operative upon receipt of a tone to provide a corresponding indication thereof.

For each tone in a sequence there is provided a filter circuit, such as circuit 212. For each tone that follows another tone in the sequence there is provided in association with the previous detector circuit a gate and switch circuit, such as circuit 245, which removes a tone bypass connection to ground upon receipt of the corresponding tone so that the succeeding tone may be received and detected.

The decoder further includes in association with the detector corresponding to the last received frequency in a sequence, an output circuit which provides both a momentary output and a latched output.

In order to alert an operator that the decoder has received a complete sequence, the apparatus is provided with a line apparatus for alerting an operator of the receipt of a complete sequence.

More specifically, the decoder includes a limiter amplifier 201 having a pair of input terminals 199 and 200 for connection to transmission media for receiving a terminal signal, such as signal 198. Terminal 200 is coupled to ground by way of a capacitor 203 and terminal 199 is coupled to the base electrode of a transistor 207 by way of a capacitor 202 and a resistor 204. The base of the transistor 207 is connected to ground by way of a resistor 205 and to positive potential at conductor 231 by way of a resistor 206. The collector of the transistor 207 is also connected to positive potential by way of a resistor 208 and the emitter of the transistor is connected to ground by way of a resistor 210 and a capacitor 209 in parallel therewith.

The received signal 198 undergoes the limiting amplification operation of this circuit and is translated thereby at the collector of the transistor 207 by way of a coupling capacitor 211 to the first tone detector 212.

The signal is received in the tone detector 212 by way of an input resistance 213 which is connected to a bridged-T circuit comprises a pair of serially connected resistors 214 and 215 which are connected to the base electrode of a transistor 221. Further, the bridged-T network comprises a capacitor 220 which connects the junction of the resistors 214 and 215 to ground, a pair of capacitors 217 and 218 which are connected together in series and in combination across the resistors 214 and 215. Further, the bridged-T network 216 includes a resistor 219 connecting the junction of the capacitors 217 and 218 to ground.

The above circuit 212 further comprises a plurality of transistors 221-224 which are interconnected with each other, the interconnection including a plurality of resistors 226–229, and resistors 225 and 230 for providing operating potentials therefor. A feedback connection is provided from the emitter of the transistor 224 to the input terminal of the bridged-T network 216.

The filter circuit 212 is tuned to receive the frequencies generated by the first tone oscillator, in this case, oscillator 10 of FIG. 1A.

Upon receiving and amplifying this frequency, the signal is passed to the detector circuit 232, particularly to the base of a transistor 237 by way of a capacitor 233 and a resistor 234.

The detector circuit 232 further comprises a resistor 235 for connecting the base of the transistor 237 to positive potential at conductor 231, a resistor 236 for connecting the base of the transistor 237 to ground, a resistor 238 for connecting the collector of the transistor 237 to conductor 231, a resistor 239 for connecting the emitter of the transistor to ground and a capacitor 240 connected in shunt relation to the resistor 239.

Operation of the detector circuit 232 provides a positive DC pulse by way of capacitor 241 and a diode 243 to the base of the transistor 248 of the gate switch circuit 245. A diode 242 shunts any negative excursions to ground and a capacitor 244 is partially charged by the output of the detector to help maintain a forward bias on the transistor 248.

The switch and gate circuit 245 comprises a pair of transistors 248 and 254 having their collector electrodes connected to positive potential at conductor 231 by way of a resistor 249 and a resistor 255, respectively. The bases of the transistors 248 and 254 are connected to ground potential by way of a resistor 247 and a resistor 252, respectively, the emitters of these transistors also being connected directly to ground. The collector of the transistor 248 is connected to the base of the transistor 254 by way of a capacitor 250 and a resistor 251.

The positive signal from the detector circuit is effective to saturate the transistor 248 and effect a discharge of the normally charged capacitor 250.

When the received tone is terminated the previously discussed circuit reverts to its unoperated condition permitting the capacitor 250 to charge over a circuit including the resistors 249, 251 and 252 thereby applying a positive potential to the base of the transistor 254 causing that transistor to become conductive and in turn place essentially ground potential via a resistor 256 upon the base of a transistor 260. The base of the transistor 260 was previously forward biased by the resistors 255, 256 and 257. This forward bias is now removed and the transistor 260 is rendered nonconductive for a time interval determined by the time constant associated with the capacitor 250 and its charging circuit.

Prior to the rendering of the transistor 269 conductive, a ground potential was extended therethrough and over a resistor 261 and a conductor 262 to a resistor 263 and the input to the filter circuit 212 from the limiter amplifier 201. This ground through the resistor 263 is effective to inhibit a response by any of the succeeding filter and detector circuits such as circuits 265 and 283.

It should be here noted that the decoder includes a regulator circuit 306, which circuit could also suffice for the regulated power supply in an encoder. The regulated circuit comprises a diode 388 and a capacitor 389 connected across the plus and minus terminals of a DC source. The diode 388 is serially connected in the emitter-collector circuit of a transistor 392 with the regulator power conductor 231. A zener diode 390 and a resistor 391 provide for still regulated operation of the transistor 392, while a capacitor 393 decouples the power conductor 231 from the effects of transient voltages and high frequency effects.

Additional filters similar to the filter circuits 212 and 265 and additional detectors and gate and switch circuits may be added to this basic configuration to provide additional codes by serial sequence detection of properly received sequentially timed and spaced tones.

When the transistor 260 becomes nonconductive, allowing the limited and amplified input signal to be applied to the filter circuit 265 by way of a resistor 264 the filter circuit 265 recognizes the tone generated by the oscillator 34 and applies an appropriate amplified output to the second detector circuit 283.

The filter circuit 265 is identical in circuit configuration to the filter circuit 212 and comprises a bridged-T network 268 including a first T circuit configuration of resistors 266 and 267 and a capacitor 272 and a second T formation including a pair of capacitors 269, 270 and a resistor 271. The serially connected resistors 266 and 267 and the serially connected capacitors 269 and 270 are connected in parallel and in series together between the input resistor 264 and the base of a transistor 273.

The filter 265 further comprises a plurality of transistors 273–276 and their corresponding biasing and connecting resistors 277–282. A feedback connection is provided between the emitter of the transistor 276 and the input to the filter circuit between the resistors 264 and 265.

The amplified signal provided by the filter circuit 265 is coupled by way of a capacitor 284 and a resistor 285 to the base of a transistor 289 in the second detector circuit 283. This detector circuit operates in the same manner as the detector circuit 232 to provide a positive pulse by way of a resistor 297 to the base of a transistor 299 in the output circuit 296. The transistor 299 has its base electrode coupled to ground by way of a capacitor 298 and its emitter electrode directly connected to ground. The collector of the transistor 299 is serially connected with an operating winding 300 of a relay and a diode 304 and the diode 388 in the regulated power supply 306. Sufficient charging of the capacitor 295 by the positive output of the detector 283 effects saturation of the transistor 299 and energization of winding 300 causing contact 302 to close with contact 303 and provide a ground output indication at terminal 303'.

The activation of the transistor 299 places ground potential on the left hand terminal of the left hand terminal of the capacitor 307 which is not only charge. The capacitor 307 discharges through a resistor 308 and the base emitter circuit of a transistor 340 to offset the normal forward bias of the transistor 340 provided by a resistor 309 connected to its base to render the transistor 340 conductive. The collector of the transistor 340 rises toward the regulated potential effective at the conductor 231 and is impressed by way of a resistor 342 upon the base of the transistor 299. Therefore, during the non-conductive interval of the transistor 340, the transistor 299 is forward biased by way of the resistors 341 and 342 causing the relay winding 300 to remain energized for the duration, as determined by the time constant of the capacitor 307 and the resistor 308.

The electrical movement of the collector of the transistor 340 toward the positive potential of the power supply provides a gating signal by way of the resistors 343 and 344 and a capacitor 345 to the gate electrode of a controlled rectifier 346 which has its cathode connected to ground and its anode connected through an indicating lamp 347 and a switch 348 to conductor 349 and the positive terminal of the electrical supply. The gating pulse renders the controlled rectifier conductive and the lamp 347 is illuminated.

Connected in parallel with the lamp 347 and obtaining its operating voltage thereacross over the conductors 351 and 351′ is a warbler circuit 354. The warbler circuit includes a well known cross-coupled free-running multivibrator comprising a pair of transistors 356 and 360, coupling capacitors 359 and 362 and biasing and timing resistors 355, 361 and 357, 358, connected in the well known configuration for said circuits.

The warbler circuit 354 further includes a unijunction transistor 368 having one of its base electrodes connected to conductor 351 and its other base electrode connected to the conductor 351 by way of a resistor 369 and a resistor 367, respectively. The emitter electrode of the unijunction transistor is connected in a capacitor charging circuit comprising a resistor 364, a capacitor 365 and a resistor 366 which are serially connected between the conductors 351 and 351′. The unijunction transistor 368 and its associated circuitry therefore forms a relaxation oscillator which causes firing of the unijunction transistor upon a sufficient potential being build up at the upper terminal of the capacitor 365.

A resistor 363 couples the collector electrode of the transistor 360 of the multivibrator to the emitter electrode of the unijunction transistor 368 to modulate the nominal operation thereof and provide a warbler frequency across the resistor 367 which feeds the base emitter circuit of a transistor 370. The collector of the transistor 370 is coupled to high and low audio outputs 375 and 374, respectively over a pair of serially connected capacitors 372 and 373 to provide an audible indication or alarm that a complete tone sequence has been received and decoded.

It should be pointed out that the basic tone filter amplifier of the bridged-T type as disclosed herein has a plurality of advantages in that when it is employed as a selective filter or an oscillator high frequency stability is obtainable over a wide temperature variation and low frequency use is possible with miniature frequency determining components. Also, the circuitry may be realized as micro-circuitry and the total circuit design permits manufacture on substrates and the employment of other space saving techniques. Further, the circuitry allows the frequency determining elements to be interchangeable between one filter and the others, without necessity of circuit adjustments in that it allows the use of common, low cost components for further economics in manufacture.

The circuit further features electronic switching of the frequency determining components and selective electronic switching from a selective filter mode to a tone generation mode with respect to frequency selection, the frequency may be shifted above and below a center frequency by changing only one end of one resistor value for each frequency change desired and parallel operation without frequency pulling from a companion circuit is advantageously realized, eventhough a companion circuit may include an LC circuit.

When employed as a selective filter the basic circuit provides an adjustable Q setting and an adjustable band width setting which may be affixed, switched, or automatically adjustable.

When employed as a tone generator the center frequency may be shifted a specific percentage either above or below, thereby allowing the same group frequency determining resistors to be employed in two or more groups. This is accomplished by switching two resistors in the filter section. Further, oscillation may be electronically or mechanically switched on and off and the full output and on frequency condition is obtainable within a single cycle.

Generally then there has been described a tone signaling system wherein a transmitting station includes an encoder having a plurality of tone generators which are sequentially enabled under the control of a plurality of serially connected monostable circuits. Further, the tone generators are in the form of a bridged-T configuration and are further configurable through the agency of code selection switches to operate at a plurality of desired frequencies. Advantageously, all capacitors of a filter are of equal value and closely matched to assure close tolerances for code module changeability. A receiving station includes a decoder having a plurality of filter circuits which are sequentially operable in response to the sequence of tones received, each filter circuit being prevented from operation until operation of the previous filter circuit has occurred, in that the preceeding tone must cease before the following decoder is opened to the audio amplifier. The last filter circuit is effective through its corresponding detector circuit to enable an output circuit so that output signals and alerting or alarm indications are provided to indicate that a full sequence of tones has been received and identified.

Many changes and modifications of this invention will be readily apparent to those skilled in the art, and it is to be understood that we intend to include in the patent warranted hereon all such changes and modifications as may be reasonably understood to come within the scope of the appended claims.

What we claim is:

1. A tone signaling system comprising:
a transmitting station including
 a plurality of tone generators each operable at a separate frequency, and
 means operable to effect timed sequential operation of said plurality of tone generators to provide a sequence of tone signals, including
  a plurality of timers each of which is connected to a separate tone generator and operable to effect timed operation thereof,
  means operable to effect sequential operation of said timers including means connecting said timers in a sequential operating order,
  keying means connected to the first timer of the sequential order for effecting operation thereof, said keying means including means for latching said keying means in an operated condition, and means connected between the last timer of the sequential order and the latching means for resetting said keying means upon operation of the last timer of the border; and
a receiving station including
 a plurality of tone detector means for detecting said tones, means connecting said tone detector means and operable to sequentially enable said tone detectors, and means operable in response to the last-effective tone detector means to provide a signal indicative of receipt of a complete signal sequence.

2. A tone signaling system according to claim 1, and further comprising
means connected to each of said tone generators for selecting the frequency of operation of said tone generators, and
an output amplifier connected in common to each of said tone generators.

3. A tone signaling system comprising:
a transmitting station including a plurality of tone generators each operable at a separate frequency, and means operable to effect timed sequential operation of said plurality of tone generators to provide a sequence of tone signals, said means including a plurality of timers each of which is connected to a separate tone generator and operable to effect timed operation thereof, and means operable to effect sequential operation of said timers;

a gap timer interposed between adjacent timers and operable in response to the operation of the preceding one of the adjacent timers to provide a timed gap between the corresponding tones by delaying operation of the succeeding timer for a period corresponding to said gap time; and a receiving station including a plurality of tone detector means for detecting said tones, means connecting said tone detector means and operable to sequentially enable said tone detectors, and means operable in response to the last-effective tone detector means to provide a signal indicative of receipt of a complete signal sequence.

4. A tone signaling system according to claim 3, and further comprising means connecting to each of said tone generators for selecting the frequency of operation of said tone generators, and an output amplifier connected in common to each of said tone generators.

5. A tone signaling system according to claim 4, wherein said switching means comprises relay means, a manually operable switch for extending operating power from an electrical supply to said relay means, and an electronic switch including charge storage means connectable to an electrical supply by said relay means to effect generation of said initiation signal and removal of the stored charge upon storage of a predetermined charge.

6. A tone signaling system according to claim 5, wherein said switching means comprises means connected to said charge storage means and to the last timer of the order and operable in response to the operation of said last timer to remove any residual charge on said charge storage means.

7. A tone signaling system according to claim 5, wherein said keying means comprises a relay driver interposed between said manually operable switch and said relay means, said relay driver operable to latch said relay means and reset means connected between said relay driver and the last timer of said sequential order and operable in response to the operation of said last timer to reset said relay means.

8. A tone signaling system comprising:

a transmitting station including a plurality of tone generators each operable at a separate frequency, and means operable to effect timed sequential operation of said plurality of tone generators to provide a sequence of tone signals, said means comprising a plurality of sequentially operable timers each connected to and effective to operate separate ones of said tone generators, and keying means operable to initiate the sequential operation of said timers, said keying means including switching means operable to provide an operation initiation signal to said first timer of said order, and means for latching said switching means in an operated condition; and a receiving station including a plurality of tone detector means for detecting said tones, means connecting said tone detector means and operable to sequentially enable said tone detectors, and means operable in response to the last-effective tone detector means to provide a signal indicative of receipt of a complete signal sequence.

9. An encoder for generating and transmitting a serial tone sequence comprising:

a plurality of timers connected in series, the operation of each said timer being initiated by the preceding timer;

means for initiating operation of the first timer of said plurality of timers, said means comprising first means for providing energizing power to said plurality of timers, said means operable to render said first means operative, third means for latching said first means operative in response to the operation of said first means, switch means included in said second means and operable to provide enabling power to said first means, relay means in said first means operable in response to the operation of said second means, and circuit means included within said third means connecting said first and second means and operable in response to the operation thereof to extend latching energy to said first means;

a plurality of tone generators each connected to and operable in response to and for the timing duration of individual ones of said plurality of timers; means for connecting said plurality of tone generators to a transmission medium; and means operable to selectively condition said tone generators to be effective at selected frequencies.

10. An encoder for generating and transmitting a serial tone sequence according to claim 9, wherein each of said timers comprises means for selectively determining the timing intervals of said timers.

11. An encoder according to claim 9, comprising:

delay means for delaying the operation of each subsequent timer in response to the operation of the corresponding preceding timer.

12. An encoder according to claim 9, wherein each of said timers comprises a monostable circuit.

13. An encoder according to claim 9, wherein said means for initiating operation of the first of said plurality of timers comprises an initial timer operable to provide an operation initiation signal to the first of said plurality timers;

switch means for rendering said initial timer operative;

means connected to said switch means and operable in response to the operation thereof to render further operations thereof ineffective; and means connected between the last of said plurality of timers and the last-named means for resetting the last-named means at the end of the tone sequence.

14. An encoder according to claim 13, wherein said initial timer comprises a charging capacitor connectable to an electrical supply by said switch means, and means operable in response to a predetermined charge on said capacitor to generate said operation initiation signal.

15. An encoder according to claim 14, wherein said encoder further comprises means connected between the last timer of said plurality of timers and said capacitor and operable in response to the operation of the last timer to remove any residual charge on said capacitor.

16. An encoder for generating and transmitting a serial tone sequence comprising:

a plurality of first timers connected in series, the operation of each said first timer being initiated by the preceding timer;

a plurality of second timers individually interposed between adjacent ones of said first timers to delay operation of the corresponding succeeding timers for the timing interval of the corresponding preceding second timer;

means for initiating operation of the first timer in the sequence of said plurality of first timers;

a plurality of tone generators each connected to and operable in response to and for the timing duration of individual ones of said plurality of first timers;

means for connecting said plurality of tone generators to a transmission medium; and means operable to selectively condition said tone generators to be effective at selected frequencies.

17. An encoder according to claim 16, comprising:

gap insertion switch means selectively operable to interpose and shunt said second plurality of timers in and out of the serially connected first-mentioned plurality of timers.

18. An encoder according to claim 16, wherein each of said timers comprises:

a timing circuit which is adjustable to render the timer active for different timing intervals; and means for selectively adjusting said timing circuit to said timing intervals.

19. An encoder according to claim 16, wherein each of said tone generators comprises:

a bridged-T oscillator circuit, and a plurality of frequency determining elements which are selectively connectable into said oscillator circuit; and said means for selectively conditioning said tone generators effective comprises:

a plurality of code selection switches for selectively connecting said frequency determining elements in circuit with said oscillators.

20. An encoder according to claim 16, wherein each of said timers comprises a monostable circuit.

21. Apparatus for encoding information to be transmitted into a serial train of tone signals, comprising:

a plurality of bridged-T oscillator circuits;

an output amplifier for coupling the outputs of said oscillator circuits to a transmission medium;

a plurality of frequency determining code selection switches operable to configure said oscillators to operate at different frequencies; and timing means having a plurality of sequentially effective outputs for sequentially enabling said oscillators, said timing means including means operable to repetitively cycle said timing means so that said serial train of tone signals is repeated.

22. Apparatus for decoding a serially received train of tone signals, comprising:

a limiter amplifier having an input for receiving said tone signals and an output for providing limited and amplified tones;

a plurality of serially activatable filter circuits each of which is tuned to pass signals within a separate range of frequencies;

a plurality of serially connected impedances, one end of the series combination being connected to the output of said limiter amplifier and the other end of the series combination being connected to the last activatable filter, alternate junctions of the series combination being connected to the inputs of said plurality of filter circuits; and means connecting the output of each detector circuit to the input of the succeeding filter circuit and effect to inhibit activation thereof until operation of the detector circuit connected and associated therewith, said means including a plurality of normally closed switch means connecting a reference potential to other alternate junctions of said series combination of impedances and operated by the preceding detector circuit to remove said reference potential.

23. Apparatus according to claim 22, comprising means connected to and operated by the detector circuit corresponding to the last activatable filter circuit to produce an output signal.

24. Apparatus according to claim 23, wherein said means for producing an output signal comprises:

a relay having contacts operable to extend a reference potential therethrough as said output signal; and means for operating said relay in response to operation of the detector circuit corresponding to the last activatable filter circuit.

25. Apparatus according to claim 23, wherein said means for producing an output signal comprises:

alarm means;

gate controlled conduction means connecting said alarm means to an electrical supply; and means for providing an enabling gate signal to said controlled conduction means in response to operation of the detector circuit corresponding to the last activatable filter circuit.

26. Apparatus according to claim 25, wherein said alarm means comprises a visual indicator.

27. Apparatus according to claim 25, wherein said alarm means comprises means for generating signals having frequencies in the audible range.

28. Apparatus according to claim 27, wherein said means for generating signals comprises means for generating first signals and means for modulating said first signals to provide a warble tone.

29. Apparatus for receiving and decoding a sequence of tone signals, comprising receiving means for receiving a sequence of tone signals;

a plurality of sequentially operable active bridged-T filter circuits;

a plurality of detector circuits each of which is connected to and operated by a different filter circuit;

a plurality of gate circuits each of which is connected to and operated by a different detector circuit, each said gate circuit further connected to said receiving means and a separate filter circuit and operable to gate the output of said receiving means to the corresponding filter circuit;

output indicating means; and means connected to the detector circuit associated with the last operable filter circuit and operable in response to detection of the last signal of a sequence to enable said output indicating means.

* * * * *